United States Patent Office 3,043,855
Patented July 10, 1962

3,043,855
16-ETHERS OF 16,17-DIHYDROXY STEROIDS OF THE PREGNANE SERIES
Josef Fried, Princeton, N.J., and Gordon H. Thomas, Birmingham, England, assignors to Olin Mathieson Chemical Corporation, New York, N.Y., a corporation of Virginia
No Drawing. Filed Aug. 1, 1958, Ser. No. 752,444
12 Claims. (Cl. 260—397.45)

This invention relates to, and has for its object the provision of, a method of preparing physiologically active steroids, and to the physiologically active steroids produced thereby.

The steroids of this invention include the ether derivatives of 16α,17α-dihydroxy steroids of the pregnane series, and more particularly steroids of the general formula

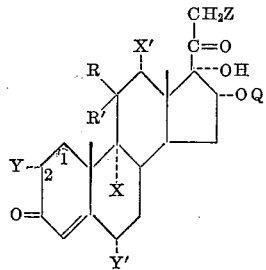

wherein the 1,2-position is saturated or double-bonded; R is hydrogen, R' is β-hydroxy or together R and R' is keto; X and X' are hydrogen, halogen (i.e. fluorine, chlorine, bromine and iodine), hydroxy, or lower alkoxy; at least one X being hydrogen; Y is hydrogen or methyl; Y' is hydrogen, fluoro or methyl; Z is hydrogen, halogen, hydroxy, or acyloxy; and Q is alkyl or aralkyl.

The compounds of this invention are prepared by interacting a steroid of the general formula

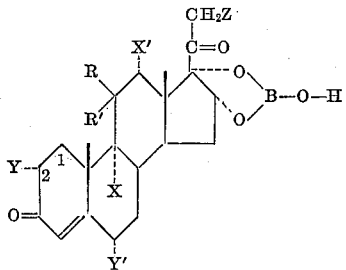

wherein the 1,2-position is saturated or double-bonded, and R, R', X, X', Y, Y' and Z are as hereinbefore defined, with a diazo compound of the formula, $Q'N_2$, wherein Q' is alkylidene or aralkylidene, preferably of less than ten carbon atoms as exemplified by the lower alkylidenes (e.g. diazomethane and diazoethane) and the monocyclic ar(lower alkylidenes) (e.g. phenyldiazomethane). The reaction is conducted in the presence of water or an alcohol, such as a lower alkanol at any normal temperature, such as ambient temperature.

Suitable starting materials for the process of this invention are described in U.S. Patent No. 2,831,003, granted April 15, 1958, and include the cycloborate esters of 16α-hydroxyhydrocortisone, 16α-hydroxycortisone,
16α-hydroxyprednisolone,
16α-hydroxyprednisone,
9α-halo-16α-hydroxyhydrocortisone (e.g. 9α-fluoro-16α-hydroxyhydrocortisone),
9α-halo-16α-hydroxycortisone,
9α-halo-16α-hydroxyprednisolone (e.g. 9α-fluoro-16α-hydroxyprednisolone),
9α-halo-16α-hydroxyprednisone,
12α-halo-16α-hydroxyhydrocortisone (e.g. 12α-fluoro-16α-hydroxyhydrocortisone),
12α-halo-16α-hydroxycortisone (e.g. 12α-chloro-16α-hydroxycortisone),
12α-halo-16α-hydroxyprednisolone,
12α-halo-16α-hydroxyprednisone,
6α-methyl-16α-hydroxyhydrocortisone,
6α-methyl-16α-hydroxycortisone,
6α-methyl-16α-hydroxyprednisolone,
6α-methyl-16α-hydroxyprednisone,
2α-methyl-16α-hydroxyhydrocortisone,
2α-methyl-16α-hydroxycortisone,
9α-halo-6α-methyl-16α-hydroxyhydrocortisone (e.g. 9α-fluoro-6α-methyl-16α-hydroxyhydrocortisone),
9α-halo-6α-methyl-16α-hydroxyprednisolone (e.g. 9α-fluoro-6α-methyl-16α-hydroxyprednisolone),
11β,16α,17α-trihydroxyprogesterone,
11-keto-16α,17α-dihydroxyprogesterone,
11β,16α,17α-trihydroxy-1-dehydroprogesterone,
11-keto-16α,17α-dihydroxy-1-dehydroprogesterone,
9α-halo-11β,16α,17α-trihydroxyprogesterone (e.g. 9α-fluoro-11β,16α,17α-trihydroxyprogesterone),
9α - halo - 11β,16α,17α-trihydroxy-1-dehydroprogesterone (e.g. 9α - fluoro-11β,16α,17α-trihydroxy-1-dehydroprogesterone),
12α-halo-11β,16α,17α-trihydroxyprogesterone (e.g. 12α-fluoro-11β,16α,17α-trihydroxyprogesterone),
12α - halo-11β,16α,17α-trihydroxy-1-dehydroprogesterone (e.g. 12α-fluoro-11β,16α,17α-trihydroxy-1-dehydroprogesterone),
21-halo-11β,16α,17α-trihydroxyprogesterone (e.g. 21-fluoro-11β,16α,17α-trihydroxyprogesterone),
21-halo-11β,16α,17α-trihydroxy-1-dehydroprogesterone,
9α,21 - dihalo - 11β,16α,17α-trihydroxyprogesterone (e.g. 9α,21-difluoro-11β,16α,17α-trihydroxyprogesterone),
and 9α,21 - dihalo-6α-methyl-11β,16α,17α-trihydroxy-1-dehydroprogesterone, as well as 21-esters of those steroids which contain a 21-hydroxy group; the preferred esters being those with hydrocarbon carboxylic acids of less than ten carbon atoms as exemplified by the lower alkanoic acids (e.g. acetic, propionic and hexanoic acid), the monocyclic aromatic carboxylic acids (e.g., benzoic acid), the monocyclic aralkanoic acids (e.g., phenacetic and β-phenyl-propionic acid) the lower alkenoic acids, the lower cycloalkane carboxylic acids. In addition the cycloborate esters of 6α-fluoro-16α-hydroxyhydrocortisone, 6α-fluoro-16α - hydroxycortisone, 6α-fluoro-16α-hydroxyprednisolone, 6α-fluoro-16α-hydroxyprednisone, 6α-fluoro-9α-halo-16α-hydroxyhydrocortisone (e.g. 6α,9α-difluoro-16α-hydroxyhydrocortisone) 6α-fluoro-9α-halo-16α-hydroxycortisone, 6α-fluoro-9α-halo-16α-hydroxyprednisolone (e.g. 6α,9α-difluoro-16α-hydroxyprednisolone) and 6α-fluoro-9α-halo-16α-hydroxyprednisone, as well as the 21-esters thereof, may be employed as starting materials. These steroids can be prepared by the method described in said Patent No. 2,831,003 and Example 3 hereinafter. Particularly preferred steroid reactants are those wherein the 1,2-position is either saturated or double-bonded, R is hydrogen, R' is β-hydroxy or together R and R' is keto; X and X' are hydrogen, chlorine or fluorine, at least one X being hydrogen; Y is hydrogen; Y' is hydrogen or fluoro; Z is hydrogen, hydroxy, or lower alkancyloxy; and Q is lower alkyl or benzyl.

If a 21-hydroxy steroid is employed as a reactant and a 21-ester derivative is the desired product, the corresponding 21-hydroxy steroid can be acylated in the usual manner. Thus, to prepare the preferred 21-acyloxy derivatives wherein the acyl radical corresponds to the acyl radical of a hydrocarbon carboxylic acid of less than ten carbon atoms, either the acyl halide or acid anhydride of a lower alkanoic acid (e.g. acetic, propionic and tert-butyric acid), a monocyclic aryl carboxylic acid (e.g. benzoic and toluic acids), a monocyclic aryl lower alkanoic acid (e.g. phenacetic and β-phenylpropionic acid), a lower alkenoic acid, a cycloalkanecarboxylic acid, or a cycloalkenecarboxylic acid is employed as a reactant.

All of the compounds of this invention are physiologically-active substances which possess glucocorticoid and anti-inflammatory activity and hence can be used in lieu of known glucocorticoids such as hydrocortisone and cortisone in the treatment of rheumatoid arthritis. For this purpose, they can be administered in the same manner as hydrocortisone, for example, the dosage being adjusted for the relative potency of the particular steroid.

The following examples are illustrative of the invention (all temperatures being in centigrade):

EXAMPLE 1

*9α-Fluoro-16α-Methoxy-Δ⁴-Pregnene-11β,17α,21-Triol-3,20-Dione*

To a solution of 490 mg. of 9α-fluoro-Δ⁴-pregnene-11β,16α,17α,21-tetrol-3,20-dione-16α,17α-cycloborate in 10 ml. of methanol is added sufficient ethereal diazomethane to give a permanent yellow coloration. The excess diazomethane is then decomposed by the addition of a few drops of 10% aqueous acetic acid. Chloroform (200 ml.) is added and the mixture is washed successively with water, sodium bicarbonate solution and again with water. Evaporation of the solvent in vacuo followed by crystallization of the residue from methanol gives about 170 mg. of 9α-fluoro-16α-methoxy-Δ⁴-pregnene-11β,17α,21-triol-3,20-dione possessing the following properties: M.P. about 248–252°; $[\alpha]_D^{23}+102°$ (C., 0.50 in chlf.);

$\gamma_{max.}^{Nujol}$ 2.94, 5.88, 6.00, 6.16μ; $\gamma_{max.}^{alc.}$ 238 mμ (ε=18,500)

*Analysis.*—Calcd. for $C_{22}H_{31}O_6F$ (410.36): C, 64.36; H, 7.61; F, 4.63; OMe, 7.56. Found: C, 64.41; H, 7.53; F, 4.73; OMe, 7.88.

The above reaction can also be carried out with ethanol, tertiary butanol or wet dioxane as the solvent.

EXAMPLE 2

*9α-Fluoro-16α-Ethoxy-Δ⁴-Pregnene-11β,17α,21-Triol-3,20-Dione*

Substituting an equivalent amount of diazoethane for the diazomethane in Example 1, there is obtained 9α-fluoro-16α-ethoxy-Δ⁴-pregnene-11β,17α,21-triol-3,20-dione.

Similarly, by substituting diazophenylmethane for the diazomethane in Example 1, there is obtained 9α-fluoro-16α-benzyloxy-Δ⁴-pregnene-11β,17α,21-triol-3,20-dione.

EXAMPLE 3

*6α,9α-Difluoro-16α-Methoxy-Δ⁴-Pregnene-11β,17α,21-Triol-3,20-Dione*

(a) *Preparation of 6α,9α-difluoro-Δ⁴-pregnene-11β,16α,17α,21-tetrol-3,20-dione 16α,17α-cycloborate.*—A solution of 200 mg. of 6α,9α-difluoro-Δ⁴-pregnene-11β,16α,17α,21-tetrol-3,20-dione and 1 g. of boric acid anhydride in 5 ml. of methanol is heated under reflux for one hour. Dilution with 30 ml. of water, followed by crystallization of the precipitated material from acetone-hexane gives 6α,9α-difluoro - Δ⁴-pregnene-11β,16α,17α,21 - tetrol-3,20-dione 16α,17α-cycloborate.

(b) *Preparation of 6α,9α-difluoro - 16α-methoxy - Δ⁴-pregnene - 11β,17α21 - triol-3,20 - dione.*—Following the procedure of Example 1, but substituting 520 mg. of 6α,9α-difluoro-Δ⁴-pregnene-11β,16α,17α,21 - tetrol-3,20-dione 16α-17α-cycloborate for the steroid reactant in the example, there is obtained 6α,9α-difluoro-16α-methoxy-Δ⁴-pregnene-11β,17α,21-triol-3,20-dione.

EXAMPLE 4

*6α,9α-Difluoro-16α-Methoxy-Δ¹,⁴-Pregnadiene-11β,17α,21-Triol-3,20-Dione*

Following the procedure of Example 3, but substituting 200 mg. of 6α,9α-difluoro-Δ¹,⁴-pregnadiene-11β,16α,17α,21-tetrol-3,20-dione for the steroid reactant in step (a), there is obtained 6α,9α-difluoro-16α-methoxy-Δ¹,⁴-pregnadiene-11β,17α,21-triol-3,20-dione.

Similarly, 6α-fluoro-16α-hydroxyhydrocortisone, 6α-fluoro-16α-hydroxyprednisolone, and 6α,9α,difluoro-16α-hydroxyprednisone yield 6α-fluoro-16α-methoxyhydrocortisone, 6α-fluoro-16α-methoxyprednisolone and 6α,9α-difluoro-16α-methoxyprednisone, respectively.

EXAMPLE 5

*9α-Fluoro-16α-Methoxy-Δ⁴-Pregnene-11β,17α,21-Triol-3,20-Dione 21-Acetate*

A solution of 100 mg. 9α-fluoro-16αmethoxy-Δ⁴-pregnene-11β,17α,21-triol-3,20-dione in 7 ml. of pyridine and 2.1 ml. of acetic anhydride is allowed to stand at room temperature for 40 hours. The mixture is diluted with water, extracted with chlorofrom and the chloroform extract washed with water. After drying over sodium sulfate the chloroform is removed in vacuo and the residue crystallized from acetone-hexane. The pure acetate has the following properties: M.P. about 217–218.5°; $[\alpha]_D^{23}+100°$ (C., 1.04 in chlf.);

$\gamma_{max.}^{Nujol}$ 2.90, 3.01, 5.71, 5.80, 6.00, 6.09μ;
$\gamma_{max.}^{alc.}$ 2.38 mμ (ε=17,900)

*Analysis.*—Calcd. for $C_{24}H_{33}O_7F$ (452–40): C, 63.70; H, 7.35; F, 4.20. Found: C, 64.24; H. 7.34; F. 4.16.

EXAMPLE 6

*9α-Fluoro-16α-Methoxy-Δ¹,⁴-Pregnadiene-11β,17α,21-Triol-3,20-Dione*

Substituting 500 mg. of 9α-fluoro-Δ¹,⁴-pregnadiene-11β,17α,21-triol-3,20-dione 16,17-cycloborate for 9α-fluoro-Δ⁴-pregnene-11β,17α,21-triol-3,20-dione-16,17-cycloborate in the procedure of Example 1, there is obtained 9α-fluoro-16α-methoxy-Δ¹,⁴-pregnadiene-11β,17α,21-triol-3,20-dione which after crystallization from methanol has the following properties: M.P. about 258–261°; $[\alpha]_D^{23}+62°$ (C., 0.47 in chlf.);

$\gamma_{max.}^{alc.}$ 239 mμ(ε=15,100); $\gamma_{max.}^{Nujol}$ 2.95, 5.88, 6.01, 6.14, 6.23μ

*Analysis.*—Calcd. for $C_{22}H_{29}O_6F$ (408.34): C. 64.69; H, 7.16; F, 4.65. Found: C, 64.58; H, 7.14; F, 4.75.

Similarly, by substituting any other cycloborate ester of a 16α,17α-dihydroxy steroid of the pregnane series for the steroid reactants in the foregoing examples, the corresponding 16α-ether derivative is formed.

The invention may be variously otherwise embodied within the scope of the appended claims.

What is claimed is:
1. A compound selected from the group consisting of steroids of the general formulae

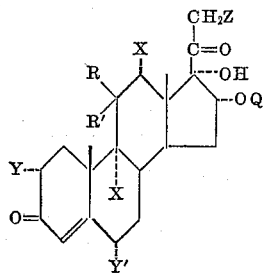

and

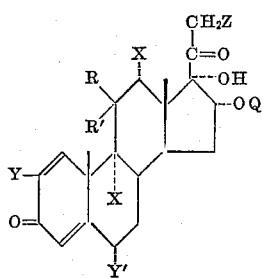

wherein R is hydrogen, R' is β-hydroxy and together R and R' is keto; each X is selected from the group consisting of hydrogen, halogen, hydroxy and lower alkoxy; at least one X being hydrogen; Y is selected from the group consisting of hydrogen and methyl; Y' is selected from the group consisting of hydrogen, fluoro, and methyl; Z is selected from the group consisting of hydrogen, halogen, hydroxy, and acyloxy; and Q is selected from the group consisting of alkyl and aralkyl.

2. $9\alpha$-halo - $16\alpha$ - (lower alkoxy) - $\Delta^4$ - pregnene-$11\beta$,-$17\alpha$,21-triol-3,20-dione.

3. $9\alpha$-fluoro-$16\alpha$-methoxy - $\Delta^4$-pregnene - $11\beta,17\alpha,21$-triol-3,20-dione.

4. $9\alpha$-fluoro-$16\alpha$-ethoxy-$\Delta^4$-pregnene - $11\beta,17\alpha,21$-triol-3,20-dione.

5. The 21-ester of $9\alpha$-halo-$16\alpha$-(lower alkoxy)-$\Delta^4$-pregnene-$11\beta,17\alpha,21$-triol-3,20-dione with a hydrocarbon carboxylic acid of less than 10 carbon atoms.

6. $9\alpha$-fluoro - $16\alpha$ - methoxy-$\Delta^4$-pregnene - $11\beta,17\alpha,21$-triol-3,20-dione 21-acetate.

7. $9\alpha$-halo - $16\alpha$-(lower alkoxy)-$\Delta^{1,4}$-pregnadiene-$11\beta,17\alpha,21$-triol-3,20-dione.

8. $6\alpha$-fluoro - $9\alpha$ - halo-$16\alpha$-(lower alkoxy)-$\Delta^{1,4}$-pregnadiene-$11\beta,17\alpha,21$-triol-3,20-dione.

9. $9\alpha$-fluoro - $16\alpha$ - (lower alkoxy)-$\Delta^{1,4}$-pregnadiene-$11\beta,17\alpha,21$-triol-3,20-dione.

10. $6\alpha$-fluoro-$9\alpha$-halo-$16\alpha$-(lower alkoxy)-$\Delta^4$-pregnene-$11\beta,17\alpha,21$-triol-3,20-dione.

11. A process for preparing a steroid of claim 1 which comprises interacting the corresponding steroidal compound selected from the group consisting of steroids of the general formulae

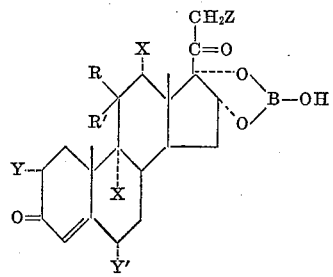

and

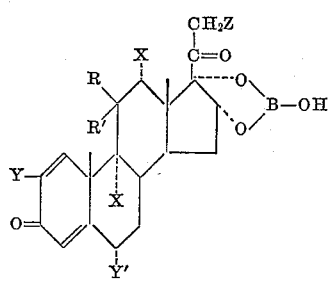

wherein R is hydrogen, R' is β-hydroxy and together R and R' is keto; each X is selected from the group consisting of hydrogen, halogen, hydroxy and lower alkoxy; at least one X being hydrogen; Y is selected from the group consisting of hydrogen and methyl; Y' is selected from the group consisting of hydrogen, fluoro, and methyl; and Z is selected from the group consisting of hydrogen, halogen, hydroxy and acyloxy; with a compound selected from the group consisting of diazoalkane and diazoaralkane in the presence of a compound selected from the group consisting of water and alcohol, and recovering the $16\alpha$-ether formed.

12. A compound of the formula:

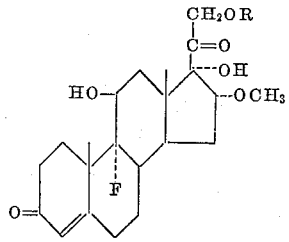

wherein R is selected from the group consisting of hydrogen and lower alkanoyl.

References Cited in the file of this patent
UNITED STATES PATENTS

| | | |
|---|---|---|
| 2,716,125 | Hirschmann | Aug. 23, 1955 |
| 2,779,774 | Hirschmann | Jan. 29, 1957 |
| 2,782,193 | Djerassi | Feb. 10, 1957 |